(12) United States Patent
Edlund Tjernberg et al.

(10) Patent No.: US 12,473,141 B2
(45) Date of Patent: Nov. 18, 2025

(54) DISPENSABLE FOOD CONTAINER

(71) Applicant: b.box for kids developments Pty Ltd, Mulgrave (AU)

(72) Inventors: Lisa Edlund Tjernberg, Mulgrave (AU); Sylvain Jacques Amatoury, Mulgrave (AU); Victor Zhen Jun Toh, Mulgrave (AU)

(73) Assignee: b.box for kids developments Pty Ltd, Notting Hill (AU)

( * ) Notice: Subject to any disclaimer, the term of this patent is extended or adjusted under 35 U.S.C. 154(b) by 131 days.

(21) Appl. No.: 18/013,034

(22) PCT Filed: Jul. 8, 2021

(86) PCT No.: PCT/AU2021/050731
§ 371 (c)(1),
(2) Date: Dec. 27, 2022

(87) PCT Pub. No.: WO2022/016209
PCT Pub. Date: Jan. 27, 2022

(65) Prior Publication Data
US 2023/0242326 A1   Aug. 3, 2023

(30) Foreign Application Priority Data
Jul. 24, 2020  (AU) ................................ 2020207877

(51) Int. Cl.
*B65D 8/14*   (2006.01)
*B65D 47/08*   (2006.01)
(Continued)

(52) U.S. Cl.
CPC ......... *B65 83/771* (2025.01); *B65D 47/088* (2013.01); *B65D 55/16* (2013.01);
(Continued)

(58) Field of Classification Search
CPC ...... B65D 1/0292; B65D 1/40; B65D 21/086; B65D 55/16; A45F 3/20; A45F 2003/205
(Continued)

(56) References Cited

U.S. PATENT DOCUMENTS

| | | | | |
|---|---|---|---|---|
| 1,924,242 A | * | 8/1933 | Kaye ...................... | B65D 55/16 |
| | | | | 222/542 |
| 2,886,084 A | * | 5/1959 | Davison ............... | B65D 21/086 |
| | | | | 220/666 |

(Continued)

FOREIGN PATENT DOCUMENTS

| | | |
|---|---|---|
| JP | H08230882 A | 9/1996 |
| JP | H09323728 A | 12/1997 |

(Continued)

*Primary Examiner* — Charles P. Cheyney
(74) *Attorney, Agent, or Firm* — Young Basile Hanlon & MacFarlane, P.C.

(57) ABSTRACT

A dispensable food container has a container body having an interior for receipt of dispensable food, and a container lid. The container body has a base and an opening opposite the base, and side walls that are collapsible. The lid has a closed condition in which it closes and seals the opening of the container body and an open condition in which the opening of the container body is exposed for access into the interior. The lid has a dispensing opening which is in communication with the interior of the container body when the lid is in the closed condition. In use, when the lid is in the closed condition, the container body is collapsible by pressure applied to the lid and the base in opposite directions to cause the side walls to collapse and to force dispensable food within the interior of the container body through the dispensing opening.

20 Claims, 6 Drawing Sheets

(51) Int. Cl.
*B65D 55/16* (2006.01)
*B65D 83/00* (2006.01)
*B65D 85/72* (2006.01)

(52) U.S. Cl.
CPC ...... *B65D 85/72* (2013.01); *B65D 2251/1058* (2013.01); *B65D 2251/20* (2013.01)

(58) Field of Classification Search
USPC .......... 222/212–215; 220/666, 375; 215/900, 215/306
See application file for complete search history.

(56) References Cited

U.S. PATENT DOCUMENTS

| | | | | |
|---|---|---|---|---|
| 3,587,937 A * | 6/1971 | Childs | ................ | B65D 47/2031 |
| | | | | 222/213 |
| 3,833,154 A * | 9/1974 | Markowitz | .............. | B65D 1/32 |
| | | | | 426/115 |
| 4,153,185 A * | 5/1979 | Nilson | ............... | B65D 83/0094 |
| | | | | 222/212 |
| 5,320,256 A * | 6/1994 | Wood | ................ | B65D 83/0038 |
| | | | | 222/215 |
| 5,384,138 A * | 1/1995 | Robbins, III | .......... | B65D 51/28 |
| | | | | 220/666 |
| 5,392,941 A * | 2/1995 | Robbins, III | ...... | B65D 43/0231 |
| | | | | 220/666 |
| 5,803,785 A * | 9/1998 | Primos, Jr. | .......... | A01M 31/004 |
| | | | | 446/188 |
| 5,813,577 A * | 9/1998 | Lee | ...................... | B65D 1/0292 |
| | | | | 222/536 |
| 5,900,293 A * | 5/1999 | Zettle | .................... | B29C 49/04 |
| | | | | 220/666 |
| 9,044,082 B2 * | 6/2015 | Kusuma | .................... | A45F 3/20 |
| 9,708,098 B2 * | 7/2017 | Plott | ....................... | A61J 9/001 |
| 10,433,632 B2 * | 10/2019 | Resic | .................... | B01F 35/522 |
| 11,026,527 B2 * | 6/2021 | Tsui | ..................... | B65D 21/086 |
| D931,055 S * | 9/2021 | Loudenslager | .............. | D19/104 |
| 2004/0040972 A1 | 3/2004 | Haj | | |
| 2006/0016819 A1 * | 1/2006 | Paslawski | .............. | B65D 23/12 |
| | | | | 215/381 |
| 2013/0032592 A1 * | 2/2013 | Lee | ..................... | B65D 21/086 |
| | | | | 220/8 |
| 2013/0181000 A1 * | 7/2013 | Miksovsky | .............. | B65D 1/40 |
| | | | | 220/780 |
| 2013/0277364 A1 | 10/2013 | Kusuma et al. | | |
| 2015/0157002 A1 | 6/2015 | Paquette | | |
| 2018/0118410 A1 * | 5/2018 | Wood | .................... | B65D 45/22 |
| 2019/0021474 A1 | 1/2019 | Resic | | |

FOREIGN PATENT DOCUMENTS

| | | |
|---|---|---|
| JP | 2002002316 A | 1/2002 |
| KR | 20110002473 U | 3/2011 |

\* cited by examiner

DISPENSABLE FOOD CONTAINER

CROSS-REFERENCE TO RELATED APPLICATION(S)

This application claims priority to Australian Patent Application Serial No. AU 2020207877, filed Jul. 24, 2020, the entire disclosure of which is hereby incorporated by reference.

TECHNICAL FIELD

The present invention relates to a food container for dispensing flowable food, principally, but not exclusively, for use by infants and toddlers. The present invention has thus been developed principally for dispensing soft or viscous flowable foods, such as pureed or mashed foods (fruit and vegetables for example), food pastes, smoothies or yogurt. It will therefore be convenient to describe the invention in relation to that application, but it is to be appreciated that the invention could have wider application for anyone that ingests flowable food, including the elderly and sports people for example.

BACKGROUND

The discussion of the background to the invention that follows is intended to facilitate an understanding of the invention. However, it should be appreciated that the discussion is not an acknowledgement or admission that any aspect of the discussion was part of the common general knowledge as at the priority date of the application.

Flowable food for infants and toddlers is available from commercial producers and is often sold in single use "food pouches". These food pouches are squeezable plastic containers that have a dispensing opening so that the flowable food product within the pouch can be squeezed out through the opening. The dispensing opening is often configured so that the infant or toddler can place the opening between their lips and squeeze the food product from the food pouch directly into their mouth. The dispensing opening usually has a closable cap, usually a screw threaded cap, to allow the food pouch to be closed so that food product can be dispensed from the food pouch over two or more occasions.

The commercial food pouches referred to above are single use only, which means that once the food product within the food pouch has been fully dispensed or exhausted, the pouch is discarded. This has detrimental environmental effects.

Alternative to the disposable commercial food pouches referred to above are re-usable dispensing or squeeze containers that can be filled and then washed after use for re-filling and re-use. These containers are squeezable for the purpose of squeezing food out of the container, but they also include a filling opening for loading flowable food into the container, with the filling opening being large enough for food to be poured or spooned for example, into the container. Separate to the filling opening, these containers also include a dispensing opening through which the food product can be expelled for feeding. The filling opening is often closed by a cover that also includes the dispensing opening. Thus, in some examples, the cover attaches about the filling opening by screw thread attachment and the dispensing opening includes a cap closure that attaches to the opening by friction or by further threaded attachment. Examples of this kind of food pouch include reusable squeeze pouches by Infantino and by the Original Squeeze Company.

A disadvantage with reusable squeeze containers currently known to the applicant is that the filling opening for filing the container is often small and/or narrow making it difficult to pass food into the container and sometimes it requires a separate filling device or use of a funnel. Moreover, those squeeze containers are often difficult to properly clean given that the insides of the container are usually only accessible through the small and/or narrow opening, and they often include sections (such as undercuts) that trap food and that are also difficult to access for cleaning purposes. A still further disadvantage with some of the reusable squeeze containers currently known to the applicant is that there can be a difficulty in squeezing out all of the food in the container and so there can be significant waste associated with their use.

The present invention aims to provide a new form of food container that can be used to dispense flowable food and that either overcomes or alleviates disadvantages with current forms of dispensable food containers, or that at least provides a useful alternative to those current forms of dispensable food containers.

SUMMARY

According to the present invention there is provided a dispensable food container, comprising:
  a. a container body having an interior for receipt of dispensable food, and
  b. a container lid,
  the container body having a base and an opening opposite the base, and side walls that extend between the base and the opening that are collapsible,
  the lid having a closed condition in which it closes the opening of the container body and an open condition in which the opening of the container body is exposed for access into the interior of the container body,
  the lid having a dispensing opening, which is in communication with the interior of the container body when the lid is in the closed condition,
  in use, when the lid is in the closed condition, the container body is collapsible by pressure applied to the lid and the base in opposite directions, or by suction applied at the spout by the person using the container, cause the side walls to collapse and to force dispensable food within the interior of the container body through the dispensing opening.

One difference in a dispensable food container according to the invention is the requirement that the container body is collapsible by the pressure applied to the lid and the base in opposite directions to cause the side walls to collapse. This differs from the prior art currently known to the applicant, in which the side walls collapse by pressure applied directly to the side walls. In that prior art, the side walls are used for collapsing the food container because the side walls are relatively long whereas the top and bottom of the containers are relatively narrow. This makes squeezing of the side walls convenient. However, in that prior art, the filling opening is provided in the top of the container and this means that the size of the filling opening is restricted to being no greater than the top in which it is situated. This practically means that the filling opening is relatively small. The outcome of this is that filling the container by pouring or spooning food into the container is difficult or at least inconvenient.

Moreover, in food containers in which the side walls are relatively long, pressure is usually applied to middle sections of the side walls and so food within the container tends to be pushed towards both the dispensing opening and the bottom end of the container. While most of the food will be expelled through the dispensing opening, some will remain trapped in the space between the region of pressure application and the bottom end of the container resulting in wasted food product.

In contrast, a dispensable food container according to the present invention can have relatively short sides and a relatively broad base and opening. The opening can be greater in area than the filling openings in the prior art currently known to the applicant, improving the ease of filling the container and removing the need for using a funnel or other filling device. Additionally, the proportions of the sides, base and opening allow the container to be more stable than many of the prior art containers when placed on a flat surface, such as a table or bench, so that in many cases, the container does not need to be held by hand or otherwise supported for filling. The broad opening also facilitates cleaning of the inside of the container (the container body in the present invention). Moreover, the lid of the food container is necessarily broad to close the opening of the container and the broad lid and base provide convenient surfaces for pressure to be applied to press them together.

The use of relatively short sides is also beneficial in ensuring that the side walls collapse in an acceptable and controlled manner. Relatively short sides can be arranged to collapse generally linearly or coaxially about a central axis, rather than buckling sideways, so that the pressure applied to the lid and the base will tend to cause them to move directly towards each other rather than skewing sideways relative to each other. Thus, food containers according to the present invention are generally short between the lid and base.

The ratio of the diameter (i.e., width) of the opening of the container body lid to the height of the side walls in the non-collapsed condition can, as examples, be in the region of 1:1, or 2:1, 2.5:1 or 3:1. In some forms of the invention, the diameter of the opening of the container body is about 77 mm while the height of the side walls in the non-collapsed condition is about 30 mm. Other examples include an opening having a diameter in the range of 60 mm to 100 mm and the height of the side walls being in the range of 20 mm to 100 mm. While the height of the side walls can be greater (e.g., larger) than the diameter of the opening of the container body lid, this brings with it difficulty in controlling how the side walls collapse effectively.

In a dispensable food container according to the invention, the side walls are collapsible for dispensing or expelling food through the dispensing opening. As the side walls collapse, the volume of the interior of the container body will reduce and food within the container body will be forced to exit the interior of the container body through the dispensing opening. For this, the side walls can be collapsible in any suitable manner. For example, the side walls can be concertinaed to facilitate collapse, or the side walls can made of a flexible material that allows collapse. Where the side walls are made of a flexible material, the lid and base will be rigid or stiff, so that they do not also collapse under pressure applied to the lid and the base. The side walls can for example, be made of a different material than the base and lid, or of the same material but of a different wall thickness to the base and lid, or the base and lid can be strengthened relative to the side walls. Thus, various options are available to make the side walls collapsible, but as indicated above, it is preferred that while the side walls are relatively flexible, each of the container lid and the base of the container body are relatively stiff or rigid. In this manner, the side walls of the container body will collapse as the lid and base are pressed together and the lid and base will retain their basic shape.

Where the side walls are flexible, they can collapse by folding over each other. In some forms of the invention, a single fold will allow the side walls to collapse to the extent required for the lid and base to move towards each other to cause the interior of the container body to reduce and to expel dispensable food out of the food container. Moreover, while the side walls are flexible, they can nevertheless have a resilience that assists recovery of the side walls to a pre-collapsed or pre-folded condition so that the tendency of the side walls is to return to the pre-collapsed or pre-folded condition. This facilitates ease in filling the container with flowable food and avoids the container tending to collapse under its own weight and dispensing food should it simply be placed on a table when filling or during feeding.

In some forms of the invention, the container body comprises a flexible substrate that forms side walls and a base and the base is reinforced, or includes reinforcement to provide the stiffness or rigidity required. The container body can be formed in a composite manner in which a flexible substrate defining a base and side walls is reinforced in the base with a rigid substrate. In this form of the invention, the flexible substrate can be a flexible polymer such as silicone which is formed in a pouch, cup or bowl shape. The rigid substrate can be attached to the base by adhesive, or it can be co-moulded into the base, such as by co-moulding or over-moulding. By this method, the rigid substrate might be partially or fully embedded in the base of the flexible substrate. Other forms of attachment or connection might be employed and for example, a releasable connection might be employed that allows the rigid substrate to be removed, such as for recycling, assembly or cleaning purposes.

The rigid substrate could be formed in any suitable manner and in some forms of the invention, it is formed as a disc. The rigid substrate could be formed from nylon for example, or of silicone that is stiffer or more rigid than the walls, or of stainless steel, for example if it is over-moulded into the base. Alternatively, polypropylene or any other stiff or rigid food-grade polymer could be employed. The disc can be of any suitable shape such as square or circular and the periphery of the disc can be profiled or configured for attachment to the flexible substrate by co-moulding or over-moulding. This profile or configuration can be a groove or channel formed at the periphery of the disc.

In other forms of the invention, the base of the flexible substrate is reinforced by the base being made thicker than the side walls. The base can include strengthening ribs for example for stiffening or increased rigidity purposes.

The container body can be formed from any suitable material and in prototypes made to date, the container body is partially formed from silicone. In the example given above, in which the container body is formed with the base of the container body reinforced by a rigid substrate, the flexible substrate defining a base and side walls is formed from silicone with a rigid nylon substrate embedded by co-moulding into the base. The container body is thus a composite part formed from a silicone or other flexible polymer formed into a pouch, cup or bowl shape, with a rigid substrate embedded into the base.

It is to be noted that reference to the side walls of the container body has been made with the expression "side walls" in plural. It is to be understood that the side walls of the container body could be circular so that it might be considered that there is one side wall rather than a plurality of side walls such as might be provided in a non-circular container body, such as a square or rectangular container body. However, the expression "side walls" is used in this specification to cover both circular and non-circular container bodies and should be interpreted as such when considering the scope of the invention.

The container lid can take any suitable form. In some forms, the opening of the container body is defined by a rim that is formed for cooperating engagement with the container lid, so that the container lid can be pressed into connection and closure with the rim. The rim can be an integral part of the container body and can, for example, be a thicker part of the side walls in the region of the opening to provide for stiffness or strength. The rim can thus be formed integrally with the side walls, but stiffness or rigidity can be provided by the rim being much thicker than the side walls.

In other forms of the invention, the rim includes or is defined by a collar that is attached to the side walls of the container body either about the opening or to form the opening, the rim being stiffer or more rigid than the flexible side walls of the container body. The side walls of the container body can extend to the opening and the rim can attach to the side walls about the opening. Alternatively, the side walls can extend towards the opening but not to the opening and the rim can attach to the side walls and extend to and form the opening.

The rim can also be formed for cooperating engagement with the container lid. The rim can do this in combination with the side walls of the container body, or separately from the side walls. In some forms of the invention, the side walls of the container body extend to the opening and the collar connects to the side walls about the opening, so that the collar extends about (e.g., surrounds) the opening and on the outside of the side walls that define the opening. The side walls can include a lip or flange that overlies an upper surface of the collar to assist to locate the collar in connection with the side walls and to provide a seal for sealing engagement with the lid as discussed below.

The container lid can be separate from the container body or it can be connected to the container body, such as by hinge connection. In some forms of the invention, the container lid is connected to the container body by a hinge connection and locks or latches with container body in the closed condition by a cooperating latch arrangement. The hinge connection can be made to the rim of the container body or in the region of the rim. Where the rim includes or is defined by a collar that is attached to the container body about or to form the opening, the hinge connection can be made between the lid and the collar. The cooperating latch arrangement can also be made between the lid and the collar. The hinge connection preferably allows the lid to be hinged completely away from the opening of the container body to provide maximum access to the opening for filling the interior of the container body with dispensable food. The latch arrangement can comprise a snap fit connection, such as a projection (a tongue for example) provided on one of the lid, or container body, or collar and an opening in the other of the lid, or container body, or collar, into which the projection can enter for latching engagement between the projection and opening. Other snap fit arrangements can be employed, such as a pair of projections that ride over each other into a nesting and/or latched condition.

The container lid can close the opening of the container in a secure manner so that movement of the lid to the open condition requires effort. This has the benefit of preventing easy opening of the container when dispensable food is present within the container. The lid could have the hinged and latched arrangement discussed above, or alternative connection arrangements could be employed, such screw threaded attachment of the lid to the container body, or even just a frictional connection. The container lid can also close the opening of the container in a sealed manner to prevent leakage of dispensable food from within the container body once the lid is in the closed condition. Sealing can be achieved by a frictional engagement between the lid and the portion of the container body that the lid engages in the closed condition, such as the rim of the container body about the opening. Suitable sealing materials can be employed for cooperating parts of the container body and the lid, such as discussed above where the side walls include a lip or flange that overlies an upper surface of the collar and which provides a seal for sealing with facing surfaces of the lid. Alternatively, an O-ring seal could be employed for example.

The lid has a dispensing opening which is in communication with, or which is open to the interior of the container body when the lid is in the closed condition. Thus, the dispensing opening can have an opening that is an inlet opening and the inlet opening faces the interior of the container body. Dispensable food within the container body can be pushed towards and through the inlet opening during collapse of the container body so that the dispensable food enters the dispensing opening through the inlet for dispensing or expelling to the outside of the container through the outlet, such as into the mouth of an infant or toddler, or onto a spoon for spoon feeding. The dispensing opening can have a passage between the inlet and outlet openings and the passage can have any suitable shape.

The dispensing opening can be configured for direct mouth application about the outlet opening, so that an infant or toddler or other person using the container can receive dispensable food directly from the dispensing opening. However, it is also an alternative that the dispensing opening be configured for receiving an attachment through which the dispensable food will flow once it passes out of the outlet opening, and such an attachment might comprise a straw or spoon shape for example.

The outside surface of the dispensing opening can be configured for mouth application, so that the lips of an infant or toddler or other person using the container can easily fit about and seal against the outside surface during dispensing of food through the dispensing opening. The preferred configuration of the dispensing opening is as a spout that is disposed at an angle to facilitate convenient feeding by providing an ergonomic position both whilst being held by a parent to feed a child and by a child who is self-feeding. The angle of the spout can be about 50-70 degrees from the horizontal. Many prior art containers have spouts which are perpendicular to the plane of the opening of the container, or other words, which extend vertically when the container is resting or standing on a horizontal surface.

A cap or closure can be provided for closing the outlet opening of the dispensing opening during periods of non-use of the container. Such a cap or closure can be used to prevent dispensable food from egress out of the dispensing opening at times other than at feeding times. The cap or closure can be a friction fit or other type of fit and can include a snap fit or screw threaded fit. The cap or closure can be tethered to the container body or the container lid, so that it is connected to the container and is not able to be misplaced. This can be a releasable connection. In some forms of the invention, the cap or closure is tethered to the lid and can cooperate with the lid when the cap or closure is removed from a closed position on the dispensing opening to an open position and the cooperation is such as to hold the cap or closure in place relative to the lid. This holds the cap or closure in one place and prevents the cap or closure from being loose and becoming an irritant to a person using the container or getting in the way of accessing the dispensing opening. For this, the lid can include a lip and the cap or closure can engage under the lip with the tether in slight tension to locate the cap or closure securely in place while feeding from the container.

BRIEF DESCRIPTION OF THE DRAWINGS

In order that the invention may be more fully understood, some embodiments will now be described with reference to the figures in which.

DETAILED DESCRIPTION

Figure 1:
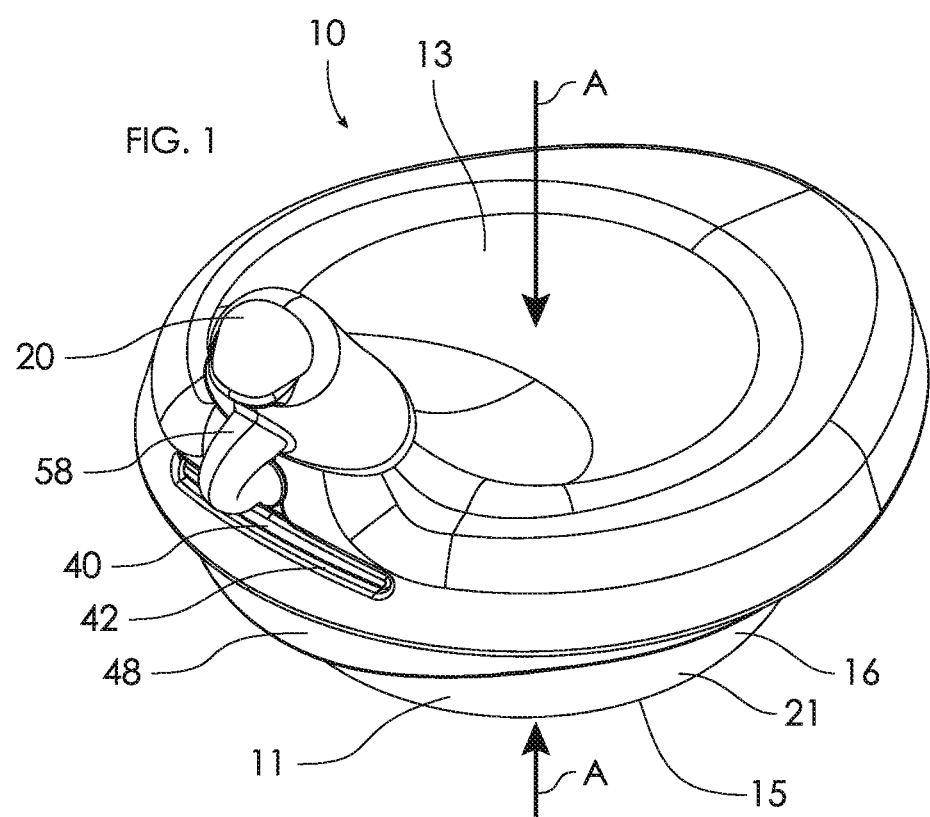
FIG. 1 illustrates a food container in accordance with one aspect of the present invention.

FIG. 1 illustrates a reusable food container 10 for feeding in accordance with one aspect of the present invention. It would be evident from the preceding description, that the food container 10 is provided for dispensing flowable food, such as is usually eaten by infants and toddlers, through a dispensing opening of the container 10 by squeezing the container 10 as later herein described.

The food container 10 includes the container body 11 that has an interior 12 (see FIG. 2) for receipt of a dispensable food, and a container lid 13.

Figure 2:
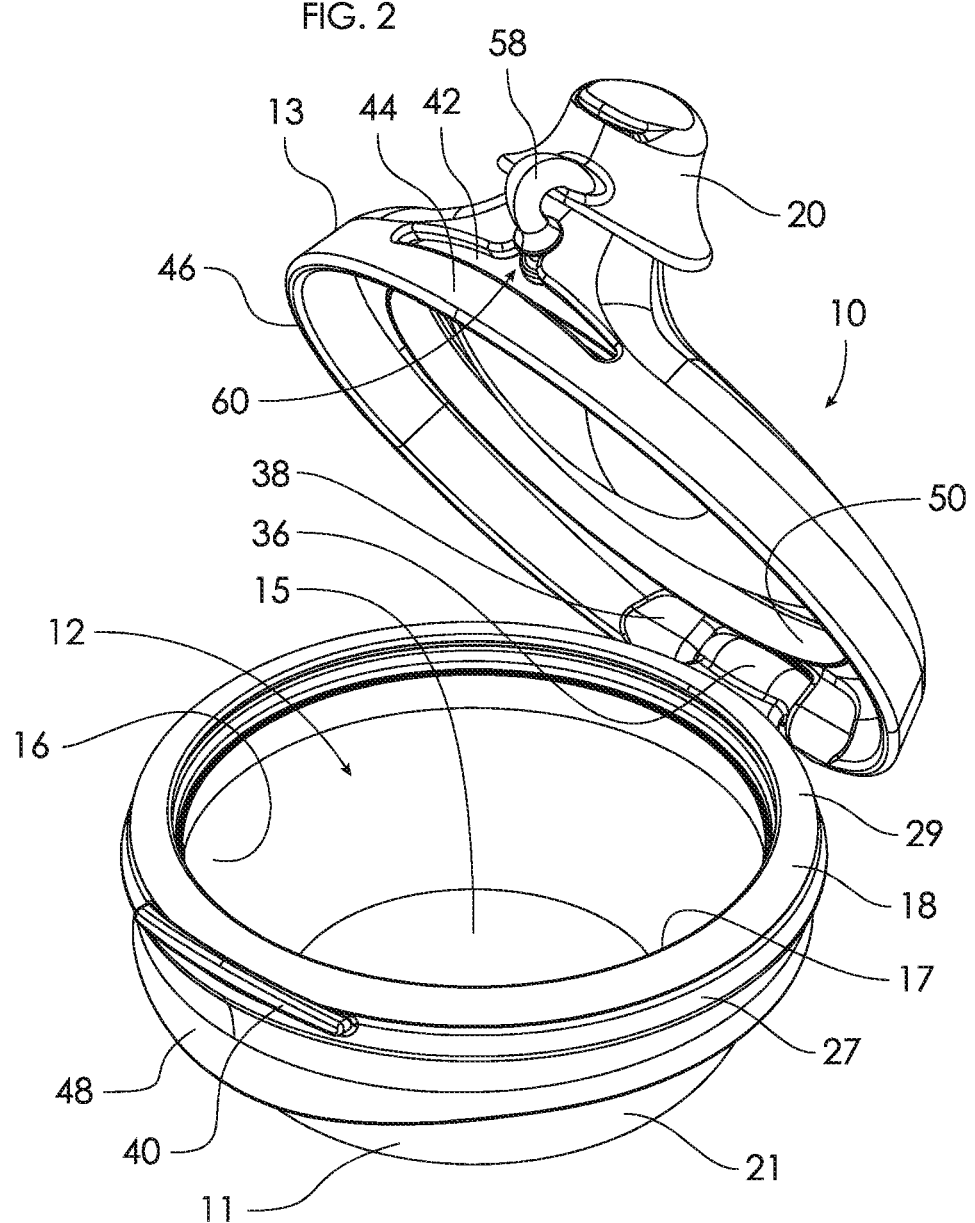
FIG. 2 illustrates the food container of FIG. 1 in a partially open condition.

The container body 11 has a base 15 and an opening 17 that is opposite and generally parallel with the base 15. Side walls 16 extend from the base 15 to the opening 17. As seen in FIG. 2, the opening is defined by a rim 18. A width of the opening 17 is the same size or larger than a height of side walls 16.

Figure 3:
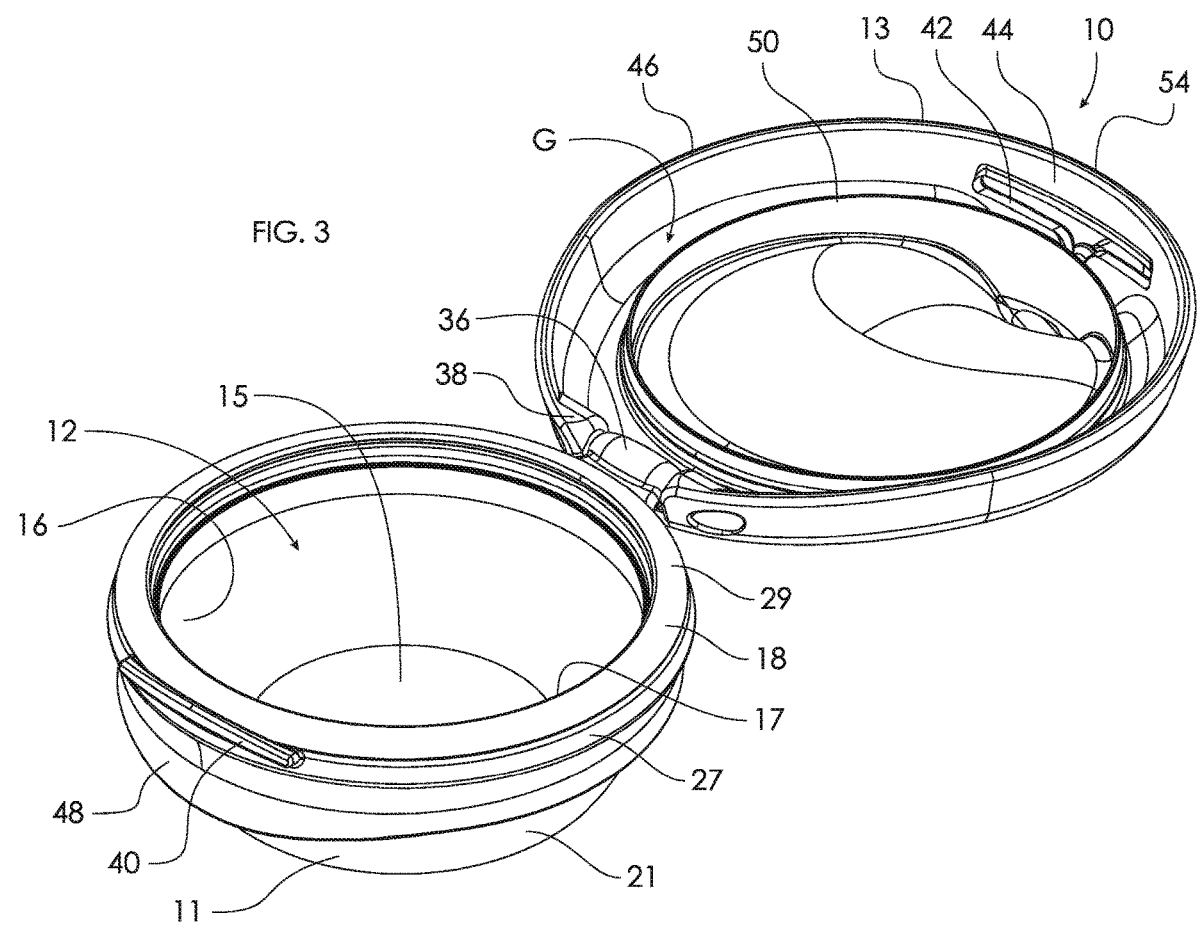
FIG. 3 illustrates the food container of FIG. 1 in a fully open condition.

The lid 13 is shown in FIG. 1 in a closed condition in which it closes the opening 17 of the container body 11. In FIG. 2, the lid 13 is shown in an open condition in which the opening 17 is exposed for access to the interior 12 of the container body 11. FIG. 3 shows the lid 13 in a fully open condition, so that the lid 13 has been rotated fully away from the opening 17 of the container body 11 in order to provide maximum access through the opening 17 for filling the interior 12 of the container body 11 with a dispensable food.

Figure 4:
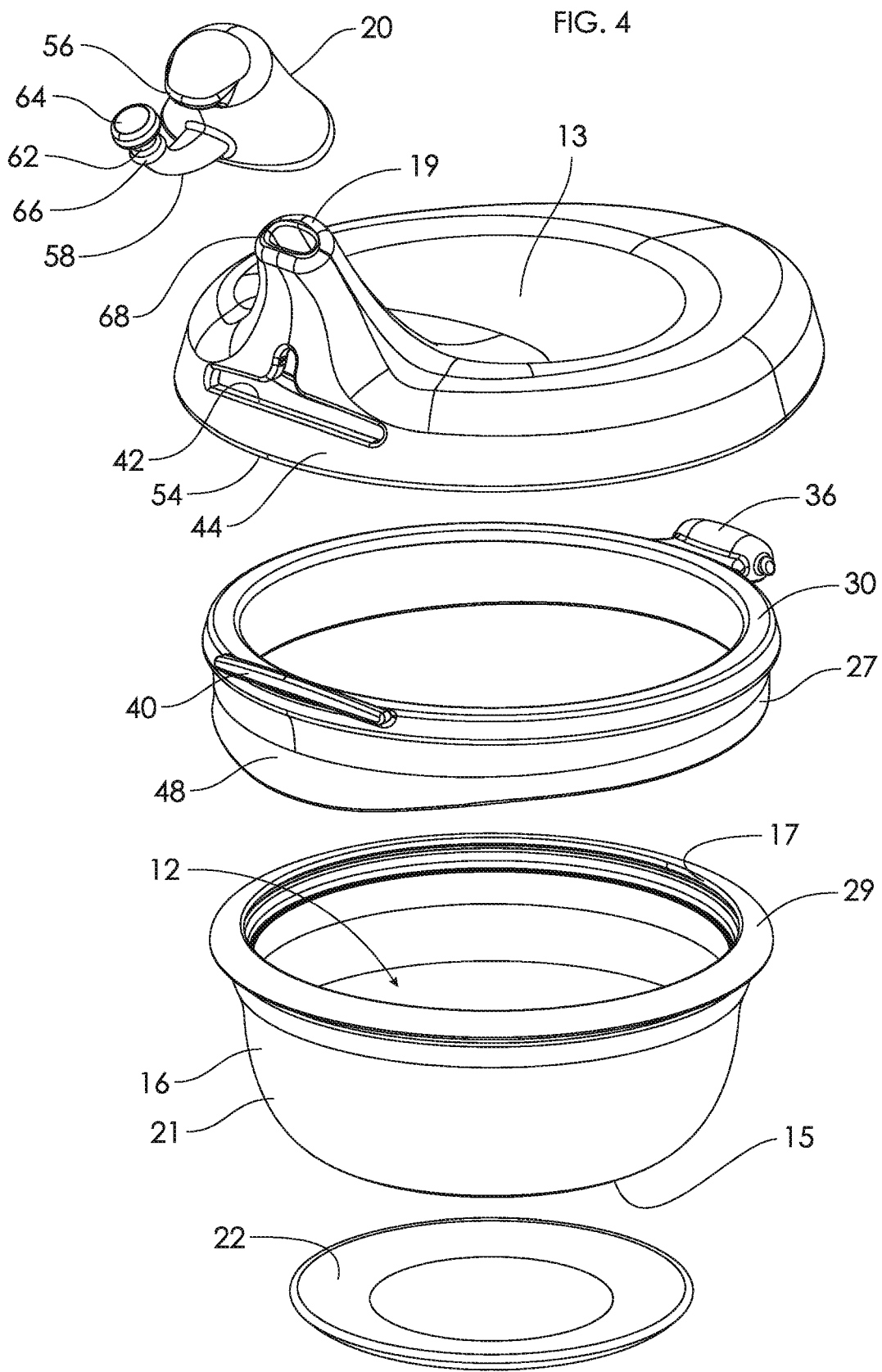
FIG. 4 is an exploded view of the food container of FIG. 1.

The lid 13 has a dispensing opening 19 which is shown in FIG. 4. The dispensing opening 19 is covered by a cap or cover 20 in FIGS. 1 and 2. The dispensing opening 19 is in communication with, or in other words, is open to the interior 12 of the container body 11 when the lid 13 is in the closed condition of FIG. 1. The dispensing opening 19 is thus open for dispensing dispensable food from within the container body 11 as will later be described herein.

The side walls 16 of the container body 11 are collapsible. With reference to FIG. 1, this means that when suction at a sprout or pressure is applied to the lid 13 and to the base 15 in opposite direction as shown by the arrows A, the side walls 16 will collapse to an extent to bring the base 15 into contact with an inner surface of the lid 13, and as a result, the interior 12 of the container body 11 will reduce in volume (i.e., size) causing the dispensable food within the interior 12 to push through and out of the dispensing opening for consumption.

In the container 10 illustrated in the figures, the side walls are made of a flexible polymer, such as silicone, and in prototypes manufactured to date, the wall thickness of the side walls is approximately 0.5 mm to 3 mm in a collapsible region of the walls, and the silicone has a shore-A hardness of between 30 and 70. Forming the side walls 16 in this manner allows them to retain their shape in the absence of forces or loads distorting the side walls, but allows the side walls to readily collapse when required. Advantageously, the side walls 16 can either self return automatically on the pressure applied between the lid 13 and the base 15 being released, or the side walls 16 can return automatically after a slight push in the direction opposite to the arrow A applied to the base as shown in FIG. 1. The side walls 16 will tend to pop back to the position shown in FIG. 1.

As shown in FIG. 4, the container body 11 comprises the base 15 and the side walls 16. In the food container 10, the base 15 and the side wall 16 are formed from a composite of a single flexible substrate such as of silicone as discussed above, into the shape of a pouch, cup or bowl 21 as shown, and the base 15 is reinforced with a rigid substrate, which is shown in FIG. 4 as a separate rigid disk 22. In prototypes made to date, the disk 22 has been formed of nylon.

Figure 5A:
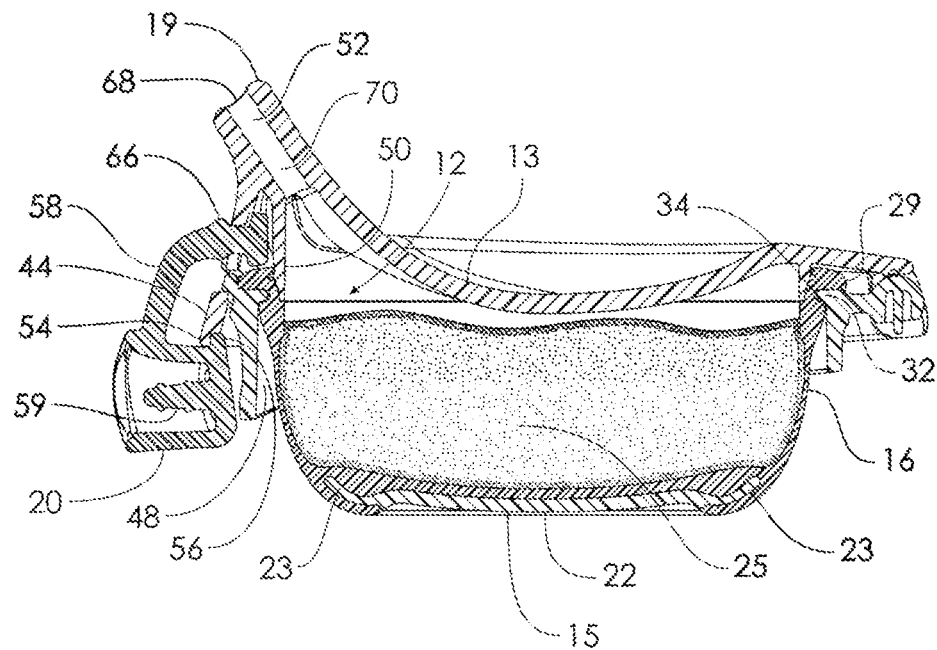
FIG. 5A is a cross-sectional view of the food container of FIG. 1, loaded with a dispensable food.
Figure 5B:
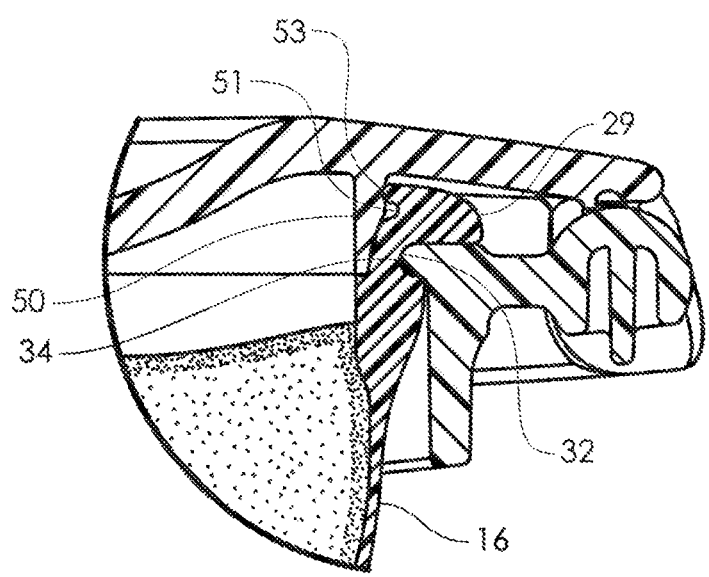
FIG. 5B is an enlarged cross-sectional view of the hinged region of the container lid.

In the food container 10, the disk 22 is formed to be an integral part of the base 15 of the container body 11 by over-moulding or co-moulding the disk 22 into the base 15 of the flexible pouch 21. This is shown in FIG. 5A where it can be seen that the disk 22 is over-moulded at the outer diameter, so that a bottom surface of the disk 22 is exposed, but the peripheral edge 23 of the disc 22 is captured within the base 15 of the pouch 21. it will be evident from FIG. 5A, that the disk 22 extends substantially across the full area of the base 15 of the pouch 21, and extends approximately perpendicular or at least laterally to the side walls 16. This renders the base 15 of the container body 11 substantially fully rigid.

The lid 13 is also substantially rigid. The lid 13 can be formed of any suitable material, such as polypropylene. It follows, that both the lid 13 and base 15 are stiff or rigid and that the side walls 16 are flexible. This means that pressure applied to the lid 13 and the base 15 in the manner shown in FIG. 1 can be such as to allow the lid 13 and the base 15 to move towards each other, as the side walls 16 collapse, thereby reducing the volume of the interior 12 of the container body 11, so as to squeeze any dispensable food within the interior 12 out of the container body 11 through the dispensing opening 19. This sequence is shown in relation to FIGS. 5A and 5B, 6 and 7 in which in FIG. 5A, the food container 10 is in the closed condition of FIG. 1 having been filed with a body of dispensable food 25. The dispensable food 25 has been inserted into the interior 12 of the container body 11 when the lid 13 is in the fully open condition shown in FIG. 3 thereafter, the lid 13 is shut (as will be described later herein) to close the container 10 for dispensing of dispensable food.

Figure 6:
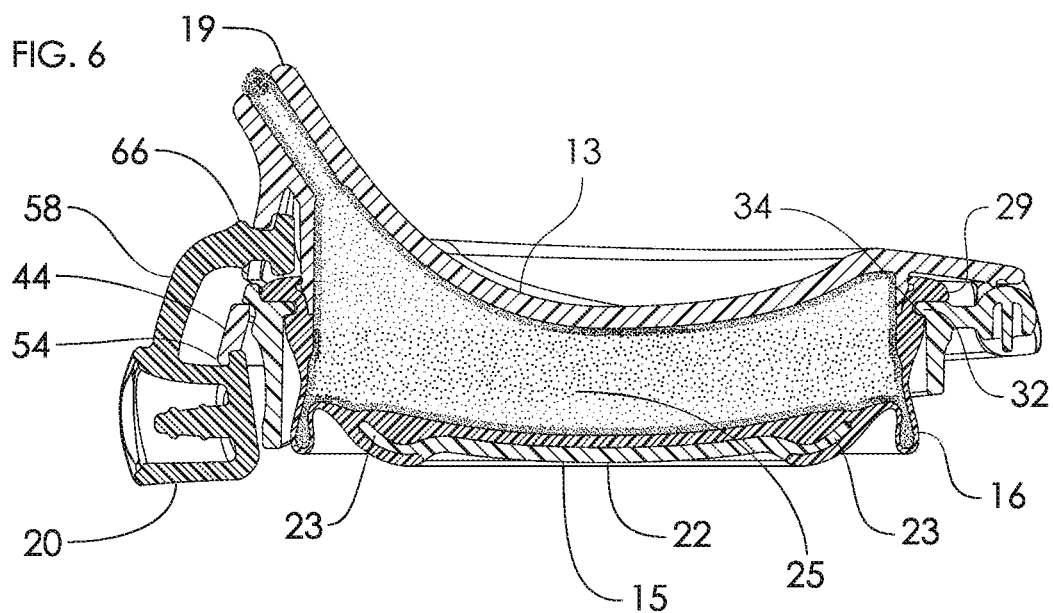
FIG. 6 is a cross-sectional view of the food container of FIG. 1, with partially collapsed side walls showing the dispensable food being expelled.

As shown in FIG. 6, the lid 13 and the base 15 have been pressed together and the side walls 16 have flexed and folded over as shown. Thus, the volume of the interior 12 of the container body 11 has reduced, so that the dispensable food 25 is pushed into the dispensing opening 19 and out through it.

Figure 7:
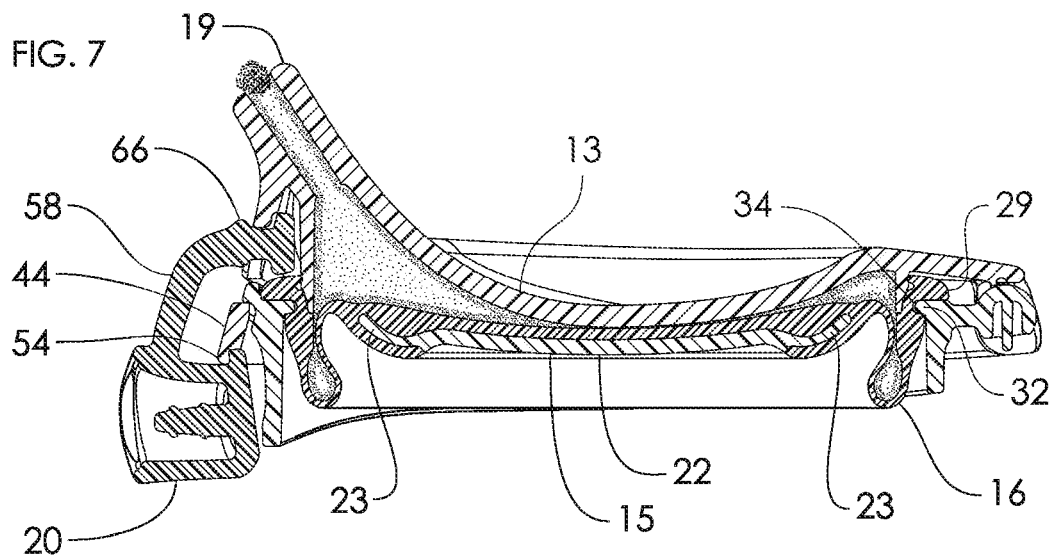
FIG. 7 is a cross-sectional view of the food container of FIG. 1, with fully collapsed side walls showing maximum expulsion of the dispensable food.

FIG. 7 illustrates that the base 15 of the container body 11 and the inside surface of the lid 13 have been pushed (e.g., brought) into touching contact with each other, further reducing the interior 12 of the container body 11 so that almost all of the dispensable food 25 previously loaded into the container body 11 has been squeezed out through the dispensing opening 19. FIG. 7 represents the maximum movement of the lid 13 and base 15 towards each other. At the point of FIG. 7, no further food can be dispensed out of the dispensing opening 19 and thus the container 10 would now be in a position where it would be reopened and cleaned and reloaded with new or fresh dispensable food.

With reference to FIG. 4, that figure shows each of the food pouch 21, the disk 22, the lid 13 and the cap 20 or closure. FIG. 4 further shows a collar 27 which attaches to the upper end of the pouch 21 of the container body 11 about the opening 17. The collar 27 is configured for cooperating engagement with the container lid 13 in both the open and closed conditions and the collar 27 is more rigid or stiffer than the side walls 16. The collar 27 for example, can be formed of polypropylene. The collar 27 attaches to the upper section of and surrounds the periphery of the side walls 16 when in a non-collapsed state and that cooperation is evident in each of FIGS. 5A and 5B to 7. As shown in FIGS. 4 to 7, the pouch 21 has a lip 29 that extends laterally to the generally upstanding orientation of the side walls 16 and lip 29 overlies the upper edge 30 of the collar 27. Moreover, FIGS. 5A and 5B to 7 show that the collar 27 includes an inwardly extending lip 32 that is received within an outwardly facing groove 34 of the side walls 16. The receipt of the lip 32 within the groove 34 connects the collar 27 to the side walls 16 about the opening 17. Each of the lip 32 and groove 34 are annular, but alternatively could be short sections of groove and lip.

The collar 27 thus connects to the side walls 16 of the pouch 21 and includes a hinge connection 36 that connects to a complementary hinge section 38 (see FIGS. 3 and 5A and 5B to 7) of the lid 13, as well as a latch 40 for receipt within an opening 42 formed in the lid 13 so that the lid 13 can snap connect with the collar 27. While the latch 40 and opening 42 are shown separately in FIGS. 2 and 3, the cooperation between the latch 40 and opening 42 is shown in FIGS. 5A and 5B to 7. When the lid is moved from the open condition of FIGS. 2 and 3, to the closed condition of FIG. 1, the portion 44 of the skirt 46 rides over the latch 40 until the latch 40 enters the opening 42 and the lid 13 is thereafter securely closed on the collar 27. To release the latch 40 from the opening 42, in order to open the lid 13, the portion 48 (see FIGS. 1, 2 and 5A) can be pressed inwardly to displace the latch 40 out of the opening 42 and then the lid 13 can be rotated away from the closed condition.

In the food container 10, the lid 13 seals against portions of the container body 11 in the closed condition. With reference to FIG. 3, the lid 13 includes an annular groove G defined by the annular flange 50 and the skirt 46. As shown in FIGS. 5A and 5B to 7, the lip 29 of the side walls 16 is located within the groove G in the closed condition of the lid 13. A seal is created by contact made between the outside surface of the annular flange 50 bearing against a facing surface of the upper end of the side wall 16. This seal can be a piston seal formed by forming an annular groove 51 that creates a flexible circular flange 53 (see FIG. 5B) at the top of the silicone pouch 21 which flexes and engages the flange 50 as the lid 13 is closed. Sealing can be improved by the flange 50 compressing or sandwiching the upper end of the side wall 16 against the lip 32. By this engagement, the lid 13 seals against the container body 11 against leakage of disposable food 25 past the lid 13.

The dispensing opening 19 has a tapered external profile and is configured to be engaged by the lips of a user as pressure is applied to the lid 13 and base 15 to expel dispensable food 25 from within the interior 12 of the container body 11 through the dispensing opening 19. FIGS. 5A and 5B to 7 show the internal passage 52 that extends through the dispensing opening 19 and FIGS. 6 and 7 show the flow of dispensable food 25 through the passage 52. It should be appreciated that while FIGS. 5A and 5B to 7 show one orientation of the food container 10 during which the lid 13 and the base 15 are being pushed or pressed together to dispense food 25 through the dispensing opening 19, the container 10 can be used in any orientation that is convenient to the user. Typically the lid would be engaged by one or more fingers of the user and the base will be engaged by the thumb of the same hand. However, the reverse could easily apply, while in addition, both hands, particularly for toddlers, could be used to apply the required pressure to the lid 13 and the base 15.

It can be seen that the outside surface of the lid 13 is concave and this profile has been applied deliberately so that the fingers of a person squeezing the container 10 naturally press towards the center of the lid 13 and thus is likely to apply a more central pressure to the lid 13, while the internal convex surface of the lid 13 tends to promote passage of dispensable food 25 in the direction of the dispensing opening 19 as shown in FIG. 7.

Various of the figures show the cap 20 in place over the dispensing opening 19, while FIGS. 5A and 5B to 7 show the cap disengaged from the dispensing opening 19 and located in a position spaced from the dispensing opening 19 and positioned so as not to interfere with placement of the lips of a mouth about the opening 19. Thus, in FIGS. 5A and 5B to 7, the cap 20 engages or clips underneath the leading edge 54 of the portion 44 of the skirt 46 of the lid 13. For this, the cap 20 includes a lip 56 that seats behind or adjacent the inside surface of the leading edge 54 and holds the cap 20 in place while that engagement is maintained. To maintain the engagement, the cap needs to be urged into engagement with the leading edge 54 and this is achieved by the tether 58 being of a length whereby it applies a load (i.e., slight tension) to the cap 20 tending to maintain the cap 56 in the engaged position of FIGS. 5A and 5B to 7.

The cap 20 includes a central spigot 59 for insertion into the passage 52 to further seal the dispensing opening 19 when the cap 20 is applied to the opening 19.

The tether 58 connects to the lid 13 in any suitable manner and in FIG. 2, the opening 42 is shown to have a central slot or groove 60 that extends upwardly from the opening 42 and that frictionally accepts the neck 62 (see FIG. 4) of the tether and that captures the head 64 (see FIG. 4) within the groove G. On the other side of the slot 60, the tether includes a shoulder 66 (see FIGS. 4 and 5A). The shoulder 66 and the head 64 tend to compress on either side of the skirt 46 about the slot 60 thereby anchoring the tether in place connected to the skirt 46. However, for cleaning purposes, it will be evident that the tether can be released from the slot 60 and once the head has entered the opening 42, the tether can be fully disconnected from the lid 13.

Operation of the food container 10 should be evident from the drawings in the above discussion, in particular FIGS. 5A and 5B to 7. Briefly, with the food container 10 closed as shown in FIG. 1, the container 10 can be filled with suitable dispensable food by releasing the latch 40 from the opening 42 and lifting the lid 13 to pivot (e.g., moveable) about the hinge sections 36 and 38 to the fully open condition of FIG. 3. Soluble food, purees, mashed foods, food pastes, smoothies or yogurt for example can be scooped or poured into the interior 12 of the container body 11 and once full, the lid 13 can be returned to the latched and closed condition.

The container 10 can be stored until it is ready for use. When ready, a person using the container 10 removes the cap 20 from the position shown in FIG. 1 in which it closes the outlet 68 (see FIG. 5A) of the dispensing opening 19 and moves it to the secure position of FIGS. 5A and 5B to 7, and then the person inserts the outlet 68 of the dispensing opening 19 into their mouth and applies pressure to the lid 13 and the base 15 of the container 10 to push the lid 13 and base 15 towards each other. As that occurs, the side walls 16 collapse by folding over as shown in FIGS. 6 and 7 and the volume of the interior 12 of the container body 11 reduces so that dispensable food 25 is forced through the inlet 70 of the passage 52 of the dispensing opening 19 and through the passage 52 to the outlet 68. Pressure continues to be applied between the lid 13 and the base 15 until sufficient dispensable food 25 has been dispensed, or alternatively that those two parts of the container 10 engage as shown in FIG. 7 and at that point, the side walls 16 have fully collapsed as shown by the full folding over of the side walls 16 in FIG. 7. In some forms of the invention, once pressure is released from the lid 13 and the base 15, the side walls 16 will automatically recover to the non-folded state shown in FIG. 5A by the resilience of the material of the side walls, although in other forms of the invention, it may be necessary for the lid 13 to be opened from the container body 11 and for the base 15 to be pushed down. Still further, the base 15 can include a small external grip so that the base 15 can be pulled downwardly away from the lid 13 when the lid 13 is still in the closed condition. The container 10 provides improvements over prior art arrangements of which the applicant is aware, by providing a large opening 17 for introducing dispensable food 25 into the interior 12 of the container body 11. Moreover, as is apparent from the figures, the components of the container 10 will be easy to clean given the full access to the interior 12 and the lid 13 when the lid 13 is in the open condition. The container 10 also provides for almost complete emptying of the container body 11 of dispensable food 25 as is evident from FIG. 7 and which is a result of the relatively broad lid 13 and base 15 compared to the height of the side walls 16. The container 10 is easy to use by both infants and toddlers, or other persons using the container 10.

Where any or all of the terms "comprise", "comprises", "comprised" or "comprising" are used in this specification (including the claims) they are to be interpreted as specifying the presence of the stated features, integers, steps or components, but not precluding the presence of one or more other features, integers, steps or components.

Those skilled in the art will appreciate that the invention described herein is susceptible to variations and modifications other than those specifically described. It is understood that the invention includes all such variations and modifications which fall within the spirit and scope of the present invention.

The invention claimed is:

1. A reusable dispensable food container for feeding, comprising:

a. a container body having an interior for receipt of dispensable food, and
b. a container lid, the container body having a bottom wall, an opening opposite to and generally parallel with the bottom wall, and one or more side walls that extend between the base bottom wall and the opening that are collapsible, a width of the opening being a same size or larger than a height of the one or more side walls in a non-collapsed condition, the container lid having a closed condition in which the container lid closes and seals the opening of the container body and an open condition in which the opening of the container body is exposed for access to the interior of the container body, a rim of the container body is positioned between the container lid and an inwardly extending lip of a collar when the container lid is in the closed condition, the container lid having a dispensing opening, which is in communication with the interior of the container body when the container lid is in the closed condition, in use, when the container lid is in the closed condition, the container body is collapsible by suction applied at the dispensing opening of the container lid to cause the one or more side walls to collapse, to force the dispensable food within the interior of the container body through the dispensing opening, and to bring the bottom wall into touching contact with an inner surface of the container lid.

2. The reusable dispensable food container for feeding according to claim 1, wherein the container body is formed in a composite manner in which a flexible substrate defining the bottom wall and the one or more side walls are reinforced in the bottom wall with a rigid substrate.

3. The reusable dispensable food container for feeding according to claim 2, wherein the flexible substrate is silicone, which is formed in a pouch, cup or bowl shape, and wherein a single fold forms in the one or more side walls during dispensing that allows the one or more side walls to collapse to an extent required for the container lid and the bottom wall to move towards one another and to cause the interior of the container body to reduce in size and expel the dispensable food out of the reusable dispensable food container.

4. The reusable dispensable food container for feeding according to claim 1, wherein the collar is pivotally connected to the container lid, and wherein the collar is stiffer or more rigid than and separable from the one or more side walls of the container body.

5. The reusable dispensable food container for feeding according to claim 1, wherein the collar is pivotally connected to the container lid, and wherein the one or more side walls of the container body extend to the opening and the collar connects to the one or more side walls about the opening, so that the collar extends about the opening and on an outside of the one or more side walls that define the opening.

6. The reusable dispensable food container for feeding according to claim 1, wherein the one or more side walls collapse within the collar that surrounds at least a portion of the one or more side walls in a non-collapsed condition, and wherein the container lid is connected to the container body by a hinge connection between the container lid and the collar.

7. The reusable dispensable food container for feeding according to claim 1, wherein the dispensing opening has an outlet opening through which the dispensable food can flow for consumption, and a cap or closure is provided for closing the outlet opening of the dispensing opening, and wherein the cap or closure is tethered to the container lid in slight tension to locate the cap or closure securely in place.

8. A reusable dispensable food container for feeding, comprising:
- a container body having a bottom wall, a rim defining an opening opposite to and generally parallel with the bottom wall, and one or more side walls that extend between the bottom wall and the rim, the container body defining an interior for receipt of dispensable food,
- a container lid having a closed condition in which the container lid closes and seals the opening of the container body and an open condition in which the opening of the container body is exposed for access to the interior of the container body, the container lid having a dispensing opening, which is in communication with the interior of the container body when the container lid is in the closed condition and the dispensing opening having an outlet opening through which the dispensable food can flow for consumption, and
- wherein the container lid is moveable between the closed condition and the open condition because of a hinged connection between the container lid and a collar,
- wherein the collar surrounds at least a portion of the one or more side walls with an inwardly extending lip of the collar positioned within a groove formed in the one or more side walls of the container body,
- wherein the rim of the container body is positioned between the container lid and the inwardly extending lip of the collar when the container lid is in the closed condition,
- wherein during expelling of the dispensable food from the interior of the reusable dispensable food container, a fold forms within the one or more side walls that moves toward the container lid as the one or more side walls collapse, and
- wherein the container body is collapsible during food dispensing to bring the bottom wall into touching contact with an inner surface of the container lid.

9. The reusable dispensable food container for feeding according to claim 1, wherein the bottom wall is configured to be engaged by either one or more fingers of a user or a thumb of a same hand of the user and the container lid is configured to be engaged by another of the one or more fingers of the user or the thumb of the same hand of the user to apply pressure to the container lid and the bottom wall in opposite directions to cause the one or more side walls to collapse and to force the dispensable food within the interior of the container body through the dispensing opening.

10. The reusable dispensable food container for feeding according to claim 8, wherein a width of the opening of the container body is a same size or larger than a height of the one or more side walls in a non-collapsed condition.

11. The reusable dispensable food container for feeding according to claim 8, wherein the bottom wall is configured to be engaged by either one or more fingers of a user or a thumb of a same hand of the user and the container lid is configured to be engaged by another of the one or more fingers of the user or the thumb of the same hand of the user to apply pressure to the container lid and the bottom wall in opposite directions to cause the one or more side walls to collapse and to force dispensable food within the interior of the container body through the dispensing opening.

12. The reusable dispensable food container for feeding according to claim 8, wherein the one or more side walls collapse within the collar.

13. A reusable dispensable food container for feeding, comprising:
- a container body having a bottom wall, a rim defining an opening opposite to and generally parallel with the bottom wall, and one or more side walls that extend between the bottom wall and the rim, wherein the bottom wall and the one or more side walls cooperatively define an interior for receipt of dispensable food;
- a collar surrounding at least a portion of the one or more side walls adjacent to the rim in a non-collapsed condition; and
- a container lid connected to the collar and having a dispensing opening through which the dispensable food can flow for consumption, wherein the container lid has a closed condition in which the container lid closes and seals the opening of the container body by positioning the rim of the container body between an inwardly extending lip of the collar and a portion of the container lid inside the rim and an open condition in which the opening of the container body is exposed for access to the interior of the container body,
- wherein when the container lid is in the closed condition, the dispensing opening is in communication with the interior of the container body, and the container body is collapsible by applying pressure to the container lid and the bottom wall in opposite directions or by suction at a spout by a person using the reusable dispensable food container to cause the one or more side walls to collapse, thereby forcing the dispensable food within the interior of the container body out of the dispensing opening, and
- wherein the bottom wall of the container body moves toward an inner surface of the container lid when the one or more side walls collapse within the collar.

14. The reusable dispensable food container for feeding according to claim 13, wherein a width of the opening of the container body is a same size or larger than a height of the one or more side walls in the non-collapsed condition.

15. The reusable dispensable food container for feeding according to claim 13, wherein the container lid is hingedly connected to the collar, and the container body is separable from the collar and the container lid.

16. The reusable dispensable food container for feeding according to claim 13, wherein a space is formed between a periphery of the one or more side walls and the collar.

17. The reusable dispensable food container for feeding according to claim 13, wherein a single fold is formed when the one or more side walls collapse that allows the one or more side walls to collapse generally parallel with the collar.

18. The reusable dispensable food container for feeding according to claim 1, wherein a flange of the container lid compresses or sandwiches an upper end of the one or more side walls against the inwardly extending lip of the collar when the container lid is in the closed condition.

19. The reusable dispensable food container for feeding according to claim 8, wherein a flange of the container lid compresses or sandwiches an upper end of the one or more side walls against the inwardly extending lip of the collar when the container lid is in the closed condition.

20. The reusable dispensable food container for feeding according to claim 13, wherein a flange of the container lid compresses or sandwiches an upper end of the one or more side walls against the inwardly extending lip of the collar when the container lid is in the closed condition.

* * * * *